F. KRAMER.
SAWING MACHINE.
APPLICATION FILED OCT. 3, 1913.
1,122,402.
Patented Dec. 29, 1914.
2 SHEETS—SHEET 2.
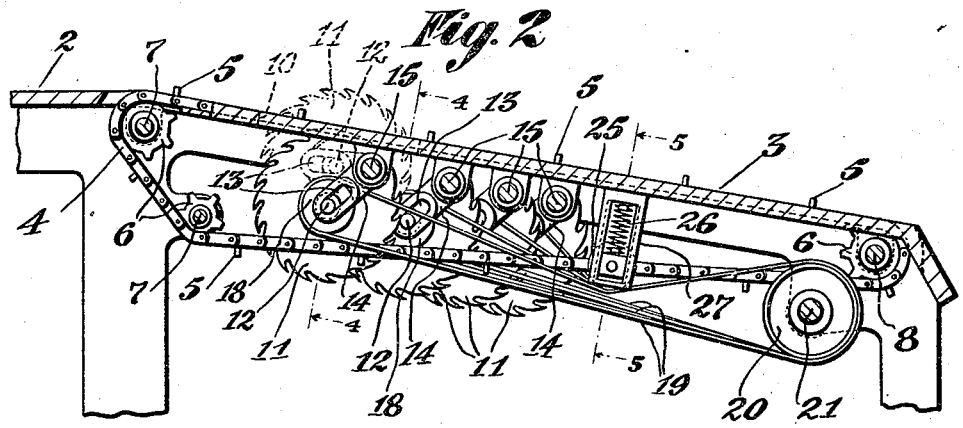
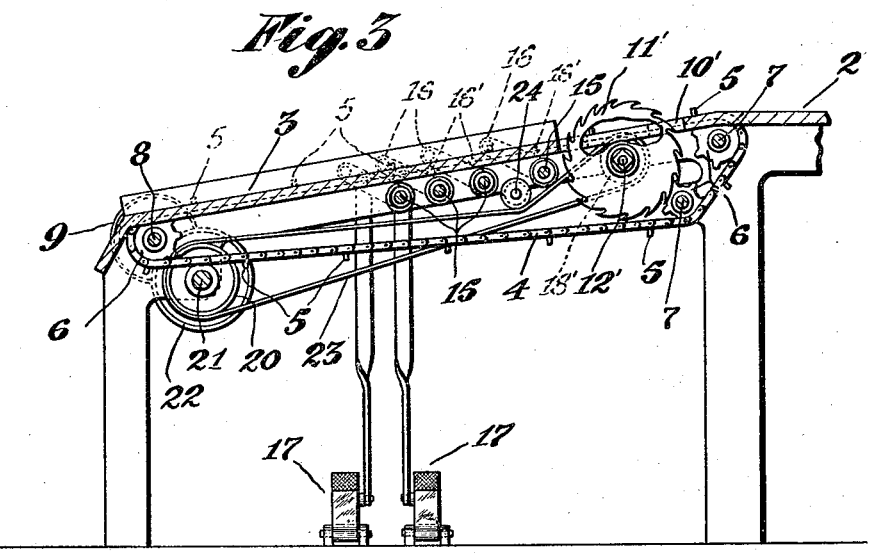
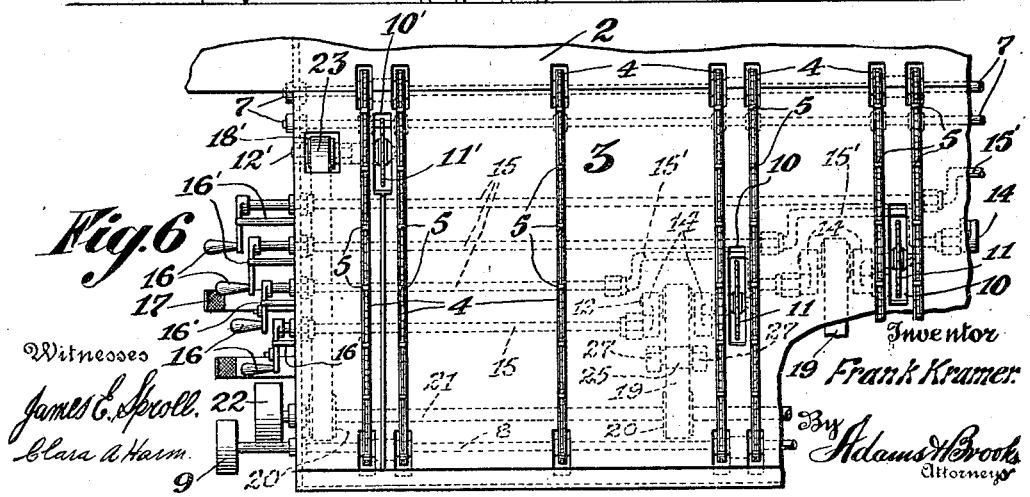

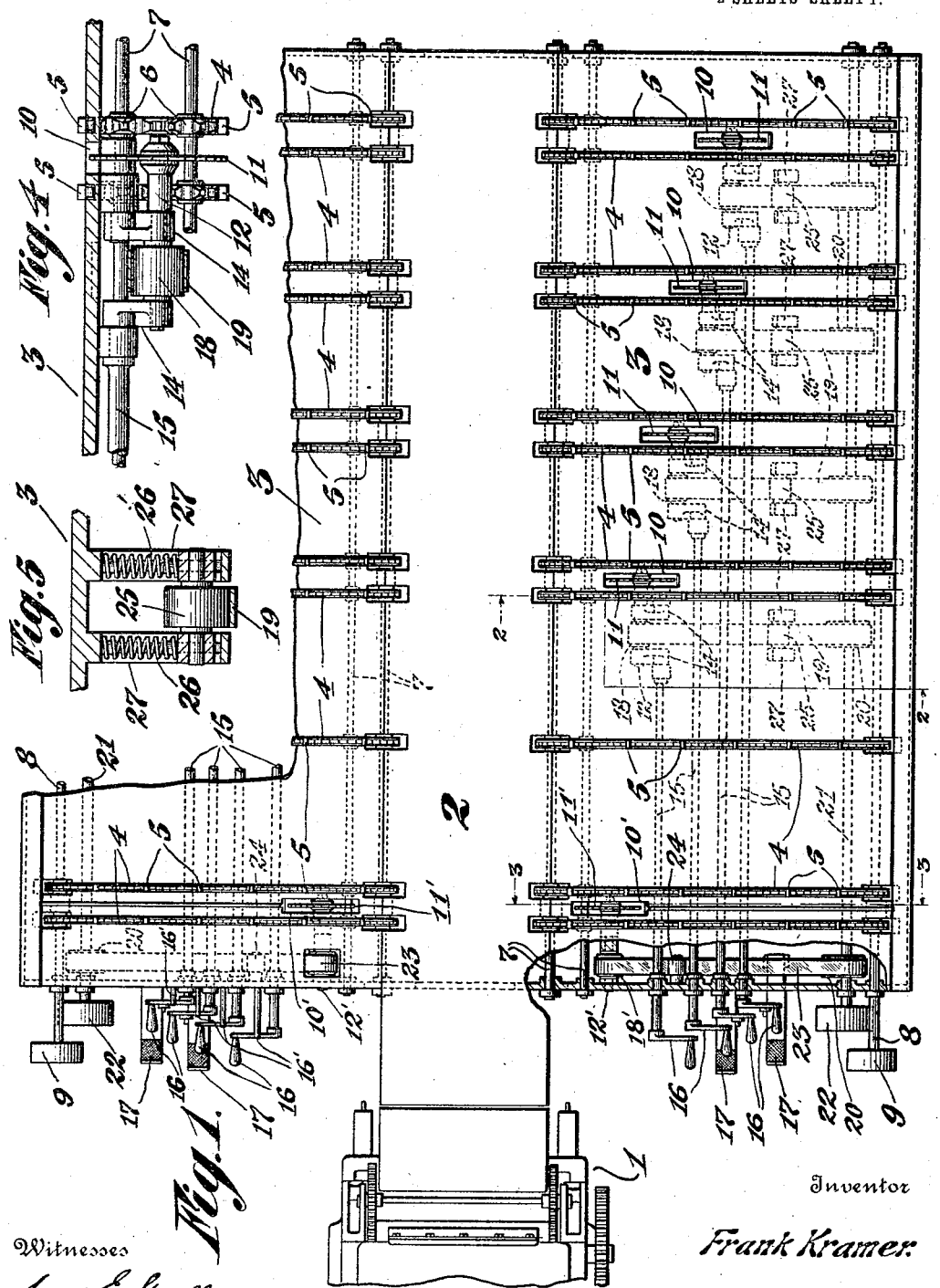

UNITED STATES PATENT OFFICE.

FRANK KRAMER, OF SEATTLE, WASHINGTON, ASSIGNOR OF ONE-HALF TO ARTHUR J. SLOCUM, OF SEATTLE, WASHINGTON.

SAWING-MACHINE.

1,122,402.  Specification of Letters Patent.  Patented Dec. 29, 1914.

Application filed October 3, 1913. Serial No. 793,165.

*To all whom it may concern:*

Be it known that I, FRANK KRAMER, a citizen of the United States of America, and a resident of the city of Seattle, in the county of King and State of Washington, have invented certain new and useful Improvements in Sawing-Machines, of which the following is a specification.

My invention relates primarily to a sawing machine especially adapted for sawing lumber to different lengths and it has for its primary aim to provide a machine or construction which will operate efficiently and be of simple and durable design.

With the above and other objects in view to be set forth as my description progresses, my invention consists in the novel features of construction, arrangements and combinations of parts defined succinctly in the appended claims.

For a full understanding of the invention, reference is to be had to the following specification and the accompanying drawings wherein like characters of reference designate like parts throughout the several views.

Figure 1 is a fragmentary top plan view of a machine embodying my invention. Fig. 2 is a transverse section thereof, taken on line 2—2 of Fig. 1. Fig. 3 is a similar view along line 3—3 of Fig. 1. Fig. 4 is a section on line 4—4 of Fig. 2 illustrating the mounting of the saw. Fig. 5 is a sectional view on line 5—5 of Fig. 2 disclosing the compensating device, and Fig. 6 is a fragmentary top plan view of a machine embodying my invention showing a different arrangement of the saws.

My invention is shown positioned at the delivery end of a planer 1, the central or horizontal table 2 of the sawing machine receiving the lumber from the planer from which point of deposit it may be fed manually, or otherwise, to the feed chains 4 which ride or operate over the inclined tables 3 disposed one on each side of the aforesaid central table. The chains which are provided with dogs 5 to effect a positive feed, take over sprockets 6 carried on shafts 7 and 8, said shafts 8 being additionally provided with a pulley 9 for receiving power from a source of power supply, in an obvious manner.

Adjacent to one end of each table 3 is provided an opening or slot 10' and spaced therefrom are other openings or slots 10 preferably arranged in stepped relation and predeterminedly spaced from one another for reasons made apparent hereinafter.

A stationarily mounted rotary saw 11' operates in opening 10', said saw being supported on an arbor 12', while saws 11, carried on their respective arbors 12, are adapted for projection through the openings 10 to an operative position. Arbors 12 are carried in the slotted end portions 13 of the swingingly mounted arms or supports 14, there being two supports provided for each arbor which form guides for the belt 19 taking over the arbor-supported pulley 18 interposed between the aforesaid supports. The belts 19 also take over pulleys 20 spaced along a common shaft 21 which has a pulley 22 adapted to be driven from a source of power supply by a belt connection (not shown.) A belt 23 takes over one of the pulleys 20 and over a pulley 18' on arbor 12' for driving the saw 11'.

An idler 24 retains the belt 23 clear of the table 3 and its adjuncts, while idlers 25 serve a similar function toward the belts 19. However, idlers 25 are yieldingly held by springs 26 in the vertical guides 27 whereby a compensating means is provided for the belts 19 during swinging of the saws 11. The guides 27 further serve to retain the belts 19 on the idlers 25.

A shaft 15 connected to one of each pair of supports 14 serves as a medium through which the respective saw may be swung to and from an operative position, said shaft terminating in a crank handle 16. Certain or all of the handles 16 may be connected to a respective foot lever 17 whereby a saw may be projected by a foot of the operator when his hands are occupied with the operation of other saws for other causes.

Assuming that all of the saws 11 are in their inoperative position and a piece of lumber is desired to be cut to a length of ten feet. The saw 11 which has been spaced from saw 11' that distance is swung or projected through the opening 10 and adapted to cut the lumber subsequent to the trimming operation by saw 11'. In this connection it will be noted that the feed chains are paired and arranged one on each side of the saws in proximity thereto whereby the lumber will not have a tendency to swerve upon reaching the saw as would be the case where a single chain is employed. In the swinging operation of the saw, the latter will practically move in a vertical path rather than in an arcuate one owing to the slidable mounting, and when in an operative position the arbor will have moved to the rear of the slot 13 and obtain a solid bearing for the sawing operation. This vertical movement of the saws will also permit of the openings 10 being of a minimum size.

In the arrangement disclosed in Fig. 6, should a sawed length of lumber be found to have a flaw therein, another saw nearer saw 11' may be projected prior to said lumber reaching the subsequently projected saw for severing the flawed portion.

To arrange the saws more in alinement, the shafts 15 may be sufficiently offset, as at 15', to avoid interference with the succeeding saw.

Having thus described my invention, what I claim as new, and desire to secure by Letters Patent of the United States of America, is:—

1. In a machine of the character described, a swinging support, a cutter mounted on the support for radial movement relative to the movement of the support, and drive means connected with the cutter, said cutter moving on the support on swinging the latter to maintain its operative connection with the drive means.

2. In a machine of the character described, a swinging support, a cutter mounted on the support for radial movement relative to the movement of the support, and drive means including an endless member connected with the saw whereby on swinging the support a relative radial movement is imparted to the cutter.

3. In a machine of the character described, a swinging support having spaced elongated bearings, a cutter disposed between the elongated bearings of the support and supported therein for movement, said cutter being adapted to engage the end walls of the elongated bearings of the support when moved to an operative position to secure a solid purchase for performing its functions, and means for driving the cutter.

4. In a machine of the character described, a table having a slot therein, a cutter adapted for projection through the table slot to an operative position, a swinging support for the cutter provided with elongated bearings to support the latter whereby the cutter may move in the support bearings on swinging the support to project the cutter through the table slot, means for swinging the support, and drive means for the cutter.

Signed at Seattle, Washington this 24 day of September 1913.

FRANK KRAMER.

Witnesses:
  MONCRIEFFE CAMERON,
  CLARA A. HARM.

Copies of this patent may be obtained for five cents each, by addressing the "Commissioner of Patents, Washington, D. C."